April 25, 1950 S. M. THOMSEN ET AL 2,505,629

METHOD OF DEPOSITING SILICA FILMS AND PREPARATION OF SOLUTIONS THEREFOR

Filed June 30, 1949

INVENTORS

Soren M. Thomsen &

Frederick H. Nicoll

BY Morris A. Kahn

ATTORNEY

Patented Apr. 25, 1950

2,505,629

UNITED STATES PATENT OFFICE 2,505,629

METHOD OF DEPOSITING SILICA FILMS AND PREPARATION OF SOLUTIONS THEREFOR

Soren M. Thomsen, Pennington, and Frederick H. Nicoll, Princeton, N. J., assignors to Radio Corporation of America, a corporation of Delaware Application June 30, 1949, Serial No. 102,262

10 Claims. (Cl. 117—124)

This invention relates to improvements in the art of depositing thin, transparent films of silica on a surface. This application is a continuation-in-part of application, Serial No. 691,158, filed August 16, 1946, now abandoned.

Thin films of silica have proven useful in the art of providing reflection-reducing surfaces on optical elements made of glass as well as in the protection of more chemically active substances from the corrosive effects of the atmosphere and other surrounding media. Heretofore, various methods have been proposed for the deposition of these silica films. One of these has been an adaptation of the well known vapor coating method in which quartz is heated to a temperature high enough to vaporize the silica. Because of the extremely high temperature at which silica vaporizes, however, this is a costly and difficult method to use. It has also been proposed to deposit silica from organic silicates, alkali silicates and from the vapor of decomposable silicon compounds such as silicon tetrachloride. Although these methods have been more or less successful for some commercial applications, it has proven to be very difficult to deposit an even film of silica having an accurately controlled thickness by any of these older methods.

One object of the present invention is to provide an improved method of depositing very thin films of silica having accurately controlled thicknesses.

Another object is to provide a method of depositing transparent films of silica with the expenditure of very little mechanical energy.

Another object is to provide an improved method of protecting glass surfaces with thin silica films.

Another object is to provide an improved method of depositing silica from a solution.

Still another object is to provide an improved method of depositing reflection-reducing films of silica on transparent optical surfaces.

These and other objects will become more apparent and the invention will be better understood from a study of the description of the invention which follows together with the accompanying drawings, of which, Fig. 1 is a graph showing the rate of deposition of a silica film deposited from a typical treating bath made up according to the present invention.

Figure 1:
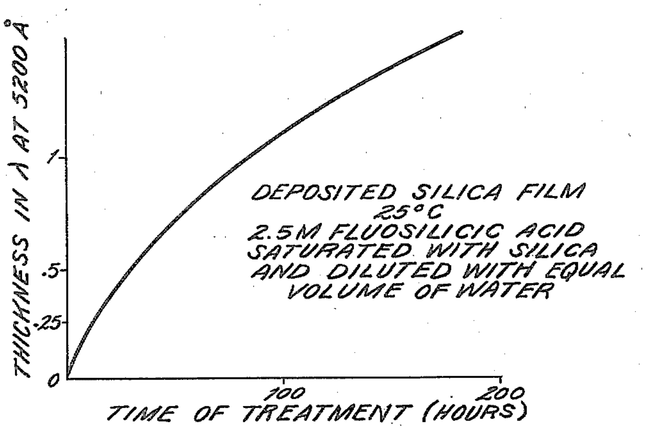

It has been found that a solution of fluosilicic acid supersaturated with just the correct amount of silica will deposit a very thin, uniform, hard, transparent film of silica upon an object immersed in the solution. This is in contrast to a fluosilicic acid solution which is either just saturated or undersaturated with silica since these latter types slowly attack most glasses instead of depositing silica on them and, of course, do not deposit silica on other surfaces immersed in them. The method of the present invention is also in contrast to the method of skeletonizing the surface of a glass article in order to produce a reflection reducing film which is described in co-pending application, Serial No. 698,441, filed September 21, 1946, now Patent No. 2,490,662. The skeletonizing process also utilizes a solution of fluosilicic acid supersaturated with respect to silica but the range of supersaturation is somewhat different in the two cases. The close similarity between the two types of solution, however, serves to indicate the fine degree of control necessary to obtain films under the present invention and the unexpectedness of the results obtained in the process.

Of course, one general method of depositing a substance chemically is to supersaturate a solution with respect to the substance, then introduce conditions which will cause the excess substance to precipitate out of the solution. This general method can also be used to obtain a deposit of silica as is well known. However, as is equally well known, the deposit of silica which is usually formed is a gelatinous mass which is of a cloudy or translucent nature. By practicing the method of the present invention, an optically thin film may be formed which is hard and transparent. This film may be so accurately controlled as to be of the order of ¼ wavelength in thickness of some desired component of white light or it may be much thicker in order to better serve as a protective coating. If it is to be used as a reflection reducing film, it may, as is well known, be made a small, odd multiple of ¼ wavelength in thickness.

The method of the present invention is performed by immersing the article to be coated in a solution of fluosilicic acid which has been made supersaturated with respect to silica within the range of about 4 to about 16 millimoles per liter. A preferred range of excess silica is about 8 to about 15 millimoles per liter and a preferred point within this range is about 10 millimoles of supersaturation per liter. The fluosilicic acid appears to act as a catalyst in the deposition of the silica.

The method of making up the treating solutions can be accomplished in several ways. It must first be pointed out that, although fluosilicic acid is generally described in the literature as conforming to the ideal formula $H_2SiF_6$, it has been unexpectedly found that commercial fluosilicic acid is capable of dissolving considerable excess silica so that the final stable solution obtained has a ratio of fluorine to silica of nearer 5 to 1 on a gram equivalent basis than the 6 to 1 indicated by the theoretical formula. This saturated solution is obtained by taking commercial fluosilicic acid and dissolving in it all the silica it will take at 25° C. Actually, the fluosilicic acid is allowed to remain in contact with solid reagent silicic acid for an hour or two in order to put in the added amount of silica. This saturated solution is then made supersaturated to the required degree. In order to do this, it may simply be diluted with water, or boric acid may be added to reduce the solubility of the silica or sodium silicate may be added to introduce the excess silica.

Figure 3:
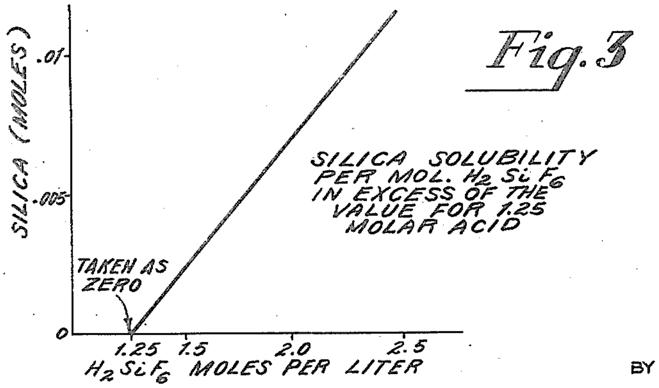
Fig. 3 is a graph of the change in excess silica solubility with concentration of $H_2SiF_6$ taking a 1.25 molar solution of $H_2SiF_6$ as a zero reference point.

The relative amount of silica, over and above that required by the formula $H_2SiF_6$, which is present in saturated solutions of various concentrations of fluosilicic acid in moles per liter is illustrated in Fig. 3. This figure is a graph of experimental results obtained using a solution containing 1.25 moles per liter of $H_2SiF_6$ as a zero reference point. The graph shows that as the concentration of the fluosilicic acid in moles per liter rises, increasing amounts of silica are dissolved per mole of $H_2SiF_6$. For example, the graph shows that a 2.5 molar solution of $H_2SiF_6$ will dissolve almost 12 millimoles more silica per mole of $H_2SiF_6$ than will a 1.25 molar solution of the acid.

Specific examples of making up the treating solution follow:

*Example 1*

A liter of 2.5 molar solution of fluosilicic acid is saturated with silicic acid at 25° C. This is then diluted with an equal volume of water to make up two liters of 1.25 M solution. The resulting solution has now become supersaturated with silica to the extent of about 12 millimoles per mole of $H_2SiF_6$ or about 15 millimoles per liter of solution and deposits silica smoothly and uniformly.

This is so since the liter of 2.5 molar solution when diluted to form 2 liters of 1.25 molar solution still has the higher amount of silica which the 2.5 molar saturated solution was able to dissolve.

The curve of Fig. 1 illustrates the rate of deposition of silica on a glass surface brought about by immersing a glass plate in this solution. As shown in the figure, a film which is ¼ wavelength of green light of 5200 Å. in thickness deposits in about 14 hours while one which is ½ wavelength thick deposits in about 30 hours. The rate of deposition decreases somewhat as the time increases. Thickness of deposit was determined visually from the interference color.

In order to compare the results of diluting the 2.5 molar solution of fluosilicic acid saturated with silica, with varying amounts of water, samples of the base solution of Example 1 were diluted with water to give solutions containing from 10 to 90 percent of the 2.5 M acid. Most of these dilutions did not give satisfactory films comparable to those obtained by diluting to about 50 percent 2.5 M acid strength since either too much or too little excess silica was caused to appear in the solution. Those, with substantially greater amounts of water, being too supersaturated with respect to silica (or silicic acid) simply produced a heavy white precipitate while those with substantially less water took unreasonably long periods of time although they deposited silica very slowly.

*Example 2*

Figure 2:
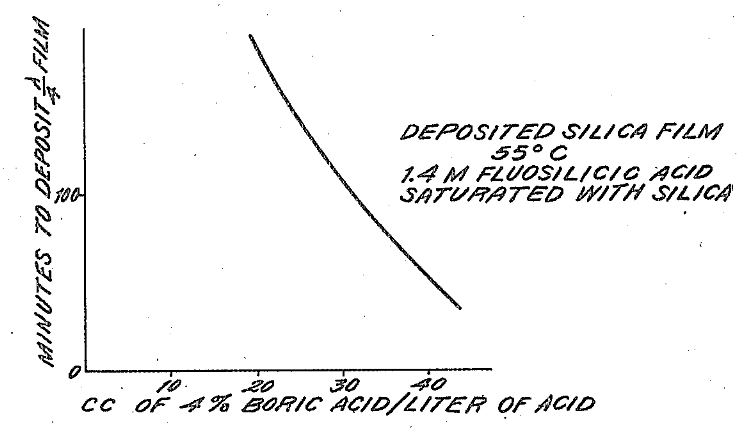
Fig. 2 is a graph showing the time necessary to deposit a ¼ wavelength film from fluosilicic acid solutions adjusted to various degrees of supersaturation with respect to silica.

To a 1.4 M fluosilicic acid solution, which is saturated with silica at 25° C., various amounts of boric acid were added in quantities ranging from 20–40 cc. of 4 percent boric acid per liter of fluosilicic acid solution. The time required for amounts within this range to deposit a film having a thickness of ¼ wavelength of green light of 5200 Å. at 55° C. is shown in Fig. 2. The addition of 20 cc. of the 4 percent boric acid per liter of the fluosilicic acid solution results in a solution supersaturated with respect to silica to the amount of 8 millimoles per liter. The 40 cc. addition caused a supersaturation of 16 millimoles. When quantities of boric acid were used sufficient to provide more than about 16 millimoles excess silica per liter a cloudy white deposit of silica formed instead of a hard, transparent film. Amounts substantially lower than 20 cc. resulted in film formation only over long periods of time and no film formation at all, in many instances, when the amount used was such as to reduce the silica supersaturation to less than about 4 millimoles per liter.

The examples given merely illustrate two ways in which a fluosilicic acid solution saturated with silica may be made supersaturated. Obviously, other equivalent reagents may be used. The concentration of the fluosilicic acid solution is not at all critical within ordinary limits. Obviously, a solution which is unreasonably dilute is not practical because of the difficulty or even impossibility of adjusting it to the correct amount of supersaturation with respect to silica while concentration above 2.5 molar cannot be obtained commercially at present.

Rate of deposition of silica also depends upon the temperature of the solution, the rate being more rapid at higher temperatures. When the temperature is too high, the deposit becomes milky. The amount of silica needed to supersaturate the fluosilicic acid solution to the required extent, of course, changes also with temperature. However, it has been found that the change is quite irregular and is different for different molar concentrations of fluosilicic acid. It has been found, for example, that in the case of a 1.25 molar solution there is no difference in the required amount of silica between a solution at 25° C. and one at 45° C. But at other concentrations, the amount does change and for most concentrations above 1.25 molar the amount is actually less than at 25° C. But, regardless of specific concentration of the fluosilicic acid within the workable limits or of ordinary temperatures of deposition, the range of supersaturation with respect to silica (or silicic acid) remains the same for the formation of good deposits within reasonable periods of time. Optimum range of temperatures to observe for good deposition has been found to be about 25° C. to about 55° C. Temperatures at least as high as 70° C. may be used at relatively low concentrations of fluosilicic acid and lower temperatures than 25° C. may be used especially when relatively high concentrations of fluosilicic acid are present. It is not practical to use the higher ranges of concentration when also using higher temperatures, however, since solutions are likely to become turbid and unfit for good deposition.

Films produced by deposition of silica by the method described are hard and smooth. Their index of refraction is 1.46 corresponding to solid silica. They appear to deposit well on any kind of glass or other ceramic surface. On glass having an index of refraction of 1.52, a ¼ wavelength film (with respect to green light of 5200 Å. has a blue interference color and has a reflectivity only 59 percent of that of the clean glass with no film. While this is not as great a reduction in reflectivity as that produced by some other methods due to the relatively high index of refraction of the film, the durability is excellent and the film is relatively inexpensive to apply.

The films can be deposited on surfaces other than those of a ceramic nature. For example, they will form on plastics. Among those giving especially good results are the urea formaldehyde and the phenolic plastics. In general, it may be said that the films can be deposited with varying degrees of excellence upon any substance not attacked by fluosilicic acid. They are useful for putting a protective surface on the article which renders it comparatively immune to attacks by many corrosive liquids and atmospheric influences.

There has thus been described an improved method of depositing hard, transparent, silica films from a controlled solution. The films may be made so thin that they will reduce reflection from a glass surface or they may be made thick enough to serve as protective coatings on various surfaces.

We claim as our invention:

1. A process of depositing a clear, hard, uniform film of silica on a glass surface, comprising immersing a glass article to be coated in a solution of fluosilicic acid supersaturated with respect to silica to the extent of about 4 to about 16 millimoles of silica per liter of solution and allowing the article to remain in said solution until a coating of desired thickness has formed.

2. The process of claim 1 in which said excess of silica is about 15 millimoles per liter.

3. The process of claim 1 in which said silica film is a reflection-reducing coating having a thickness which is a small odd multiple of ¼ wavelength of light of predetermined wavelength.

4. A method of preparing a solution for the deposition of clear, hard films of silica, comprising saturating a fluosilicic acid solution with silica and then supersaturating said solution with silica to the extent of about 4 to 16 millimoles of silica per liter.

5. The method of claim 4 in which said supersaturation is accomplished by diluting the saturated solution with water.

6. The method of claim 4 in which said supersaturation is accomplished by adding to said saturated solution a soluble silicate.

7. A process of depositing a film of silica on a ceramic surface comprising immersing an article having said ceramic surface in a solution of fluosilicic acid having a concentration of about 1.25 molar and which is supersaturated with respect to silica to the extent of about 4 to about 16 millimoles of silica per liter of solution and allowing the article to remain in said solution until a coating of desired thickness has formed.

8. The process of claim 7 in which said ceramic surface is glass.

9. A method of preparing a solution for the deposition of clear, hard films of silica comprising saturating a solution of fluosilicic acid with silica and then supersaturating said solution with silica by adding a small amount of boric acid.

10. A process of depositing a transparent, hard, film of silica on a glass surface, comprising immersing a glass article to be coated in a solution of fluosilicic acid having a molar concentration of between about 1.25 and about 4 and which is at a temperature not exceeding about 70° C., said solution being supersaturated with respect to silica to the extent of about 8 to about 16 millimoles of silica per liter of solution, and allowing said article to remain in said solution until a coating of desired thickness has formed.

SOREN M. THOMSEN.
FREDERICK H. NICOLL.

REFERENCES CITED

The following references are of record in the file of this patent:

UNITED STATES PATENTS

| Number | Name | Date |
|---|---|---|
| 2,366,516 | Geffcken | Jan. 2, 1945 |

OTHER REFERENCES

Mellor, "Comprehensive Treatise on Inorganic and Theoretical Chemistry," vol. 6, 1925, pages 941–943.